(12) United States Patent
Raymond et al.

(10) Patent No.: US 6,970,401 B2
(45) Date of Patent: Nov. 29, 2005

(54) FRINGING FIELD FOCUS MOTOR AND MECHANISM FOR OPTICAL DISK DRIVE

(75) Inventors: Peter J. Raymond, Erie, CO (US); Thomas E. Berg, Fort Collins, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/947,111

(22) Filed: Sep. 4, 2001

(65) Prior Publication Data

US 2002/0057631 A1    May 16, 2002

Related U.S. Application Data

(60) Provisional application No. 60/140,633, filed on Jun. 23, 1999.

(51) Int. Cl.[7] ............................................. G11B 7/00
(52) U.S. Cl. ............................. 369/44.19; 369/44.18; 369/44.14
(58) Field of Search .......................... 369/44.11, 44.14, 369/44.15, 44.16, 44.17, 44.18, 44.19, 44.22, 369/112.01

(56) References Cited

U.S. PATENT DOCUMENTS

| 5,440,533 | A | * | 8/1995 | Fujimaki et al. | ......... | 369/44.18 |
| 5,465,242 | A | * | 11/1995 | Terashima et al. | ....... | 369/44.19 |
| 6,236,634 | B1 | * | 5/2001 | Lee et al. | .............. | 369/112.23 |

* cited by examiner

Primary Examiner—Muhammad Edun
(74) Attorney, Agent, or Firm—Jonathan W. Hallman; MacPherson Kwok Chen & Heid LLP

(57) ABSTRACT

A system for controlling a distance between an optical head and the surface of a rotating optical disk comprising: an actuator arm having a first and second surface, the first surface facing the optical disk, the second surface facing away from the optical disk; an electromagnetic coil having an inner void, said coil adjacent to the second surface of the arm; and at least one permanent magnet producing a magnetic field that passes through the coil such that when an electric current is applied to the coil, a force is created at two or more segments of the coil.

15 Claims, 10 Drawing Sheets

FRINGING FIELD FOCUS MOTOR AND MECHANISM FOR OPTICAL DISK DRIVE

CROSS-REFERENCE TO RELATED APPLICATIONS

The present application is related to patent application Ser. No. 09/560,781, filed Apr. 28, 2000, entitled "Miniature Optical Disk for Data Storage," patent application Ser. No. 09/548,128, filed Apr. 12, 2000, entitled "Low Profile and Medium Protecting Cartridge Assembly," patent application Ser. No. 09/540,657, filed Mar. 31, 2000, entitled "Low Profile Optical Head," patent application Ser. No. 09/393,899, filed Sep. 10, 1999, entitled "Content Distribution Method and Apparatus," patent application Ser. No. 09/393,150, filed Sep. 10, 1999, entitled "Writeable Medium Access Control Using a Medium Writeable Area," Provisional Application Ser. No. 60/140,633, filed Jun. 23, 1999, entitled "Combination Mastered and Writeable Medium and Use in Electronic Book Internet Appliance," and patent application Ser. No. 09/315,398, filed May 20, 1999, entitled "Removable Optical Storage Device and System," all of which are incorporated herein by reference in their entireties.

FIELD OF THE INVENTION

The present invention is directed generally to an optical disk drive and more specifically to a method and mechanism for positioning an optical pickup element relative to an optical disk. The invention may utilize single or multiple optical disks. In the case of a single disk, the disk may be removable or non-removable.

BACKGROUND OF THE INVENTION

Optical disk drives are ideally suited for use in personal electronic devices (PEDs). By way of example, optical disk drives may be advantageously utilized in PEDs such as digital cameras, music reproduction equipment, MP3 players, cellular telephones, dictating equipment and personal digital assistants such as microcomputers. In particular, as compared to magnetic disk drives, optical disk drives are superior in terms of storage capacity, power consumption and data transfer speed. As a result, they can be smaller in size and cost. To be practical in PEDs, however, the optical drives need to be substantially pocket sized (e.g., no more than about 100 mm in the largest dimension, but preferably no more than about 50 mm, and preferably having at least one cross section no more than about 100 mm by about 50 mm, preferably no more than about 75 mm by about 25 mm) and have a mass of no greater than about ⅓ kg.

Much of the development of optical disk data storage has centered around apparatus in which the read/write mechanism was configured to position a read/write beam at a desired radial location on the disk in a substantially linear fashion (i.e., linear actuators). Typically, a sled carrying an objective lens moves radially along a pair of rails between the inside and outside diameter of a disk for coarse tracking purposes. A second mechanism positions the objective lens for fine tracking purposes. Further structure also moves the objective lens orthogonally relative to the disk surface for purposes of adjusting the focus of the light beam on the data layer of the disk. While linear actuators have proved useful in a number of contexts, such as for reading/writing CDs and DVDs, the location and mass of the components in linear actuators has typically affected performance parameters such as access time, data transfer rates, and the like. In addition, linear actuators are relatively high-friction devices and require precise track alignment. Linear actuators typically add substantial thickness to a read/write or drive device and generally do not scale well toward miniaturization. Also, linear actuators are typically unbalanced systems in that the mass of the components, including the objective lens, is not evenly distributed relative to any pivot point. As a result, such actuators are highly susceptible to shock and vibration. Thus, linear actuators have, in general, found greatest use in applications where thickness, access time, bandwidth and power consumption are of less importance, and typically are used in larger stationary devices where space for moving the read/write head is available and the risk of shock or significant vibration is minimized.

Another factor affecting the size of an optical system is the size and shape of the light beam as it reaches the optical disk (the spot size and quality). Spot size and quality are, in turn, affected by a number of factors including the size of the optical components, relative movement among the optical components, the distance the light beam must travel and the format of the optical disk. Although a wide variety of systems have been used or proposed, typical previous systems have used optical components (such as a laser source, lenses and/or turning mirrors) that were sufficiently large and/or massive that functions such as focus and/or tracking were performed by moving only some components of the system, such as moving the objective lens (e.g. for focus) relative to a fixed light source. However, relative movement between optical components, while perhaps useful for accommodating relatively large or massive components, presents certain disadvantages, including a relatively large form factor and the engineering and manufacturing associated with establishing and maintaining optical alignment between moveable components. Such alignment often involves manual and/or individual alignment or adjustment procedures which can undesirably increase manufacturing or fabrication costs for a reader/writer, as well as contributing to costs of design, maintenance, repair and the like. Accordingly, it would be useful to provide an optical head method, system and apparatus which can reduce or eliminate the need for relative movement between optical components during normal operation and/or can reduce or eliminate at least some alignment procedures, e.g., during reader/writer manufacturing.

In order to adequately miniaturize the mechanics associated with an optical disk drive for use in commercially acceptable PEDs, the optical recording system's focus of the laser spot on the recording and playback surface must be maintained to assure acceptable recording and playback data integrity. In general terms, an objective lens directs a light beam to the optical disk and focuses the light beam into a conical shape with the apex or focal spot occurring at the data layer within the optical disk. Ideally, the conical beam is perpendicular to the surface of the disk, although, given irregularities in the manufacture of the disk and its component layers (i.e. disk flatness), bearing defect frequencies, and tolerances in the manufacture and assembly of the mechanical components, as well as shock and vibrations imparted into the disk drive during operation, perpendicularity between the disk surface and light beam is difficult to maintain. The distance between the objective lens and the data layer determines the particular characteristics which the objective lens must possess. For example, the farther the data layer of the disk is from the objective lens, the larger the objective lens must be in order to focus the light beam into the proper conical shape with the focal spot at or proximate to the data layer. In turn, as the objective lens increases in size in order to form the appropriately sized light beam, the other optical components must also increase in size in order to complement each other. Thus, for miniaturization purposes, it is critical to minimize this distance between the objective lens and the data layer on the disk.

A significant factor in reducing the distance between the objective lens and the data layer of the optical disk is the characteristics of the disk itself. Optical disks used in consumer products today are typically second surface optical media as opposed to first surface optical media. The present invention is optimized to read first-surface media, although it can be used to read second surface media as well. Although it may be subject to more than one definition, first-surface optical media refers to media in which the read beam during a read operation is incident on or impinges on information content portions of the first-surface optical media before it impinges on a substrate of the first-surface optical media. The information content portions can be defined as portions of the optical media that store or contain servo data, address data, clock data, user data, system data, as well as any other information that is provided on the optical media. The information content portions can be integral with the substrate, as is the case with read-only media. The information content portions can also be separately provided. In such a case, the information content portions can be, for example, an information layer of a writeable media. Stated conversely, second-surface media can refer to media in which the read beam is incident on the surface of the media or disk before it is incident on the information content portions.

A relatively thick and transparent outer layer or substrate of second-surface optical medium makes read-only or read-write operations relatively insensitive to dust particles, scratches and the like which are located more than 50 wavelengths from the information content portions. Considering the cone angle of the light beam after the light beam passes through the objective lens, there is also little detrimental change to the shape or power of the light spot by the time it reaches the information layer of this second-surface optical medium. On the other hand, the second-surface optical medium can be relatively sensitive to various optical aberrations. These optical aberrations include: (1) spherical aberrations—a phase error causing rays at different radii from the optic axis to be focused at different points; (2) coma—creating a "tail" on the recorded spot when the transparent layer is not perpendicular to the optical axis; (3) astigmatism—creating foci along two perpendicular lines, rather than a symmetric spot; and/or (4) birefringence—different polarizations of light behaving differently because the read-only or read-write beam must propagate through a relatively longer distance before reaching the information layer, when an aberration is created at the air/transparent layer interface. This longer distance is attributable to the thickness of the relatively thick transparent substrate or layer. Compounding the unwanted birefringence is the requirement that the read-write beam must also traverse the transparent layer again after reflection.

Some or all of the aberrations arising from the presence of the thick transparent layer can, at least theoretically, be partially compensated for by using a suitable focus mechanism. However, such a focus mechanism, including the optical elements thereof, tends to be large in size and, concomitantly, increases the cost of the system. Additionally, such a focus mechanism typically can only provide compensation for a single, pre-defined thickness of the layer. Because there are likely be to spatial variations in the thickness or other properties of the transparent layer, such compensation may be less than desired at some locations of the medium.

Another drawback associated with second-surface optical media is that the optical requirements of such media are substantially inconsistent with the miniaturization of the disk drive and optical components for such media. As will be appreciated by reference to FIG. 1a, a longer focal length "f" is required for an optical system that will read information from or write information onto second-surface media. This is due to the relatively thick transparent layer "T" through which the radiation must pass to access the recording or data layer "D." To provide the longer focal length, a larger beam cone is required which, in turn, requires larger optical components (e.g., objective lens "O"). Moreover, the relatively long optical path through the thick transparent layer to the data layer and back through the transparent layer after reflection significantly decreases laser power efficiency in comparison to a medium without the transparent layer. In comparison, a shorter focal length "f" can be achieved by utilizing first surface recording instead of second surface recording. Importantly, a smaller focal distance "f" allows use of a smaller objective lens "O." This in turn allows the other optical components to be reduced in size thereby facilitating overall miniaturization.

To date, rotary actuators have not provided an adequate solution to miniaturization in optical disk drives. Like linear actuator systems, rotary actuator systems are subject to the same problems created by imperfections in the manufacture of disks, mechanical tolerances in the manufacture and assembly of the actuator arm and spindle, bearing defect frequencies, shock and vibration, among others. As a result, the data surface may be out of focus at any point in time, creating errors in reading from or writing to the disk. As stated earlier, optical drives have attempted to address this problem by moving the objective lens orthogonal to the ideal or presumed plane of the disk surface to change its focal position, and thereby attempt to maintain focus. This methodology has limited effectiveness. For example, in larger disks, such as DVDs lid and CDs, errors or fluctuations are compounded as the objective lens moves toward the outer diameter of the disk. Thus, in order to try to maintain focus, the objective lens is required to move a greater distance away from or toward the disk surface (in the Z direction). However, the necessary range of movement in a miniaturized system would likely be constrained by space limitations and/or physical limits purposefully placed in the drive to limit movement. In unbalanced systems in particular, such physical limits are required to prevent linkages from moving past their elastic limits, primarily due to external shock.

SUMMARY OF THE INVENTION

The fringing field focus motor of the present invention solves many of the miniaturization problems associated with previous optical disk drive systems. The present invention comprises an actuator arm positioned between an optical disk and a magnet assembly. A planar wound electromagnetic coil is substantially parallel and adjacent to the arm and the magnet assembly comprising magnetized zones having alternating magnetic fields wherein the transitions between the alternating zones are aligned with two or more active portions of the electromagnetic coil. The magnetic field from the alternating zones passes through the active portions of the coil substantially parallel to the surface of the disk.

The optical pick up unit is supported at the distal end of the focus arm. The optical pick up unit includes a light source, such as a laser, an objective lens for directing the light beam to the recording/playback surface of the disk and intermediate optical components such as turning mirrors and focusing lenses. The light beam is folded utilizing turning mirrors to achieve a length that is compatible with a chosen objective lens. The optical pickup unit achieves further miniaturization when used in combination with media utilizing first surface data, although it will also work with second surface media. In the context of first surface data, the objective lens can be smaller because the information containing portion or data layer is closer to the objective lens which allows use of a lens with a shorter focal length.

The tilt focus method of the present invention also introduces an out-of-perpendicular condition for the laser beam for purposes of maintaining the focus of the light beam on the data layer of the disk. Rotation of the focus arm relative to the tracking arm moves or pivots the focus arm which also moves the optical pick up unit, including the objective lens. In general terms, the optical pick up unit will move in an arcuate or curved path toward or away from the surface of the disk, although the directional component of movement orthogonal to the disk surface is substantially greater than the directional component of movement parallel to the disk surface. For purposes of this application, however, the terms perpendicular or substantially perpendicular will be used to refer to movement of the optical pick up unit in each embodiment.

The fringing field focus motor (FFFM) has several advantages over prior designs. The first is improved bandwidth. For purposes of this invention, "bandwidth" refers to the useful frequency ranges in which the electromechanical servo systems of the arm can maintain (the required) focus and tracking accuracy. Because the focus mechanism is carried on the tracking arm, the focus servo system affects the tracking servo system. The high bandwidth and low mass of the focus mechanism components located on the tracking arm result in a tracking arm of lower mass, which minimizes lessens the moment about the axis. Thus the highly efficient and lightweight focus mechanism results in increased bandwidth of the tracking arm servo system as well as enabling a single stage actuator arm capable of both high bandwidth focus and tracking servo systems. An actuator incorporating the FFFM can maintain focus and tracking over a wide range of media imperfections or disturbances occurring over a wide range of frequencies. The fringing field passing through the coil substantially parallel to the surface of the disk results in a larger focusing component of force (in the Z direction) and thus creates not only a more efficient motor, but also allows placement of the FFFM focus coil substantially parallel to the surface of the disk and thus improves both the structure and balance of the arm. Improved structure and balance both allow broader effective focus bandwidth for an actuator incorporating the FFFM. Prior designs utilized more complicated two stage designs to minimize mass of one portion of the actuator and thereby increase total system bandwidth. The more efficient and lower mass FFFM allows a simpler, lower cost single stage rotary actuator arm. The second advantage is decreased size of the optical disk drive. The high efficiency and the placement of the focus coil substantially parallel to the disk results in a compact motor that enables a very low profile optical disk drive. A third advantage of the FFFM is the ability to resist large disturbances due to external shock, media imperfections or a variety of other causes which tend to disturb the focus of the objective lens on the media. The low coil weight and high efficiency of the FFFM results in an actuator that has the capability of producing high levels of lens acceleration, of resisting high levels of external shock or accommodating disturbances from a variety of other sources. Prior designs with lower acceleration performance are more likely to allow errors in read or write data integrity due to insufficient acceleration capability. A fourth advantage of the FFFM is reduced power consumption. High FFFM efficiency and low mass reduce the current required to maintain the focus accuracy needed to maintain acceptable read/write performance. Among other advantages such as reduced heat generation, this lower power consumption makes the FFFM better than prior designs for use in battery powered devices with reduced electrical storage capacities.

By dynamically adapting the position of the objective lens during operation of the drive, the system can respond to variations in the relative position of the data layer caused by imperfections in the manufacture of the disk, manufacture and assembly tolerances of component parts, bearing defects, spindle motor run out, shocks, vibrations and other conditions that cause misalignment of the light beam relative to data on the disk. In this manner, the present invention will overcome conditions that could otherwise result in read/write errors.

BRIEF DESCRIPTION OF THE DRAWINGS

FIG. 7b is a cross sectional view of the embodiment shown in FIG. 7a.

DETAILED DESCRIPTION

Figure 1A:
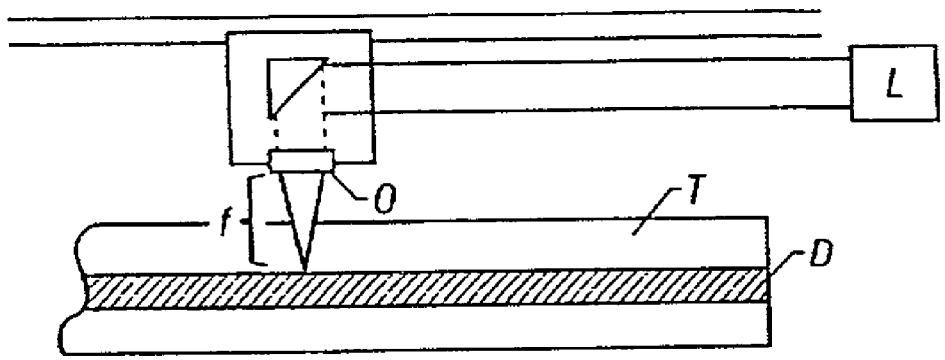
FIG. 1a is a cross-sectional schematic view of a linear actuator and light beam focused on a non-first surface data layer.
Figure 1B:
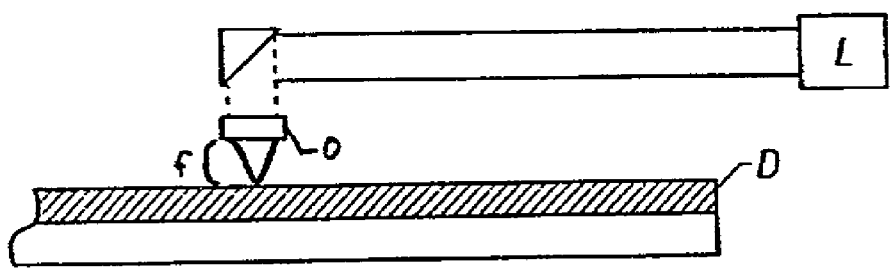
FIG. 1b is a cross-sectional schematic view of a linear actuator and light beam focused on a first surface data layer.
Figure 2:
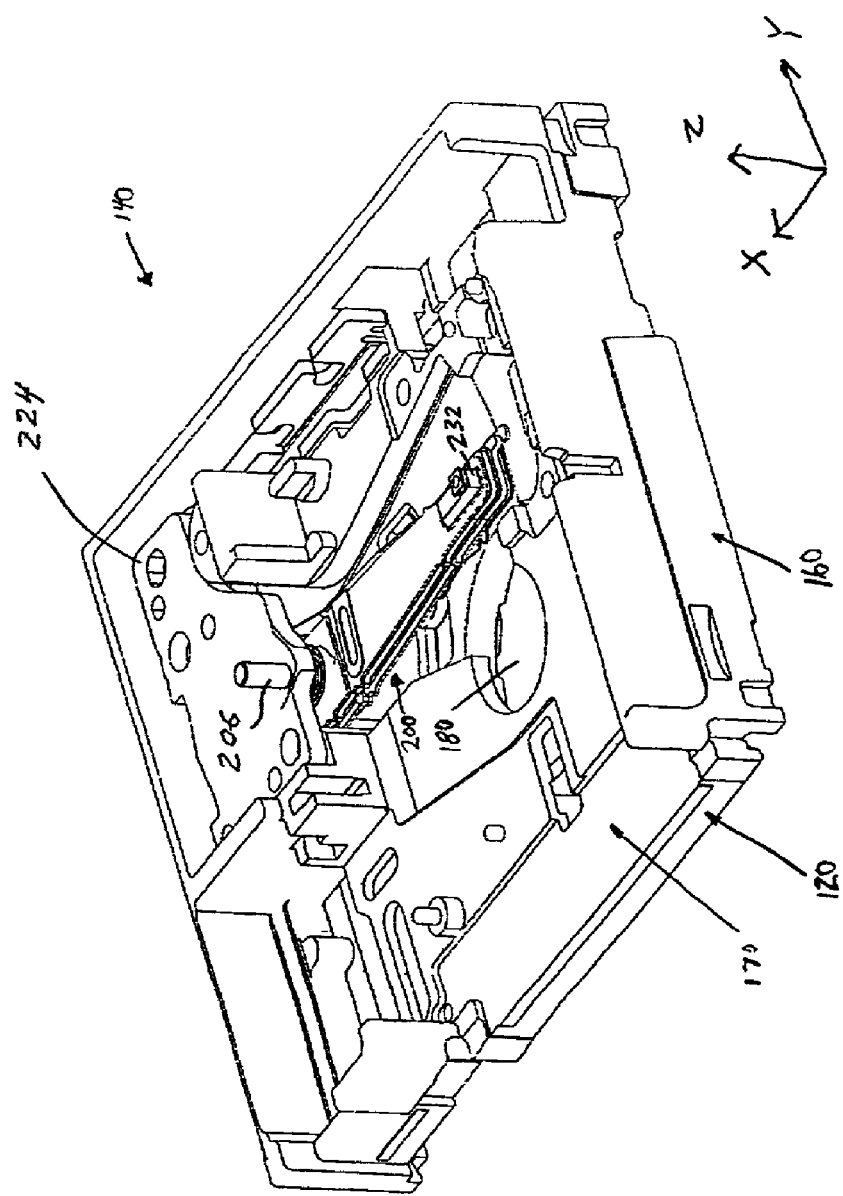
FIG. 2 is a three-quarter perspective view of an optical disk drive of the present invention.

Turning to FIG. 2, a first embodiment of an actuator arm 200 is shown within the housing 120 of an optical drive 140. The housing 120 includes a base plate 160 having an aperture 180 for receiving a spin motor (not shown) and a slot 170 to receive a cartridge containing an optical disk (not shown). A cartridge is inserted into the slot 170 and engages the spin motor. An optical pick up unit (OPU) 232 is positioned at the distal end of the actuator arm 200 and directs a light beam (not shown), such as a laser, to an optical disk within the cartridge which is spinning at a rapid rate. The light beam may be used to write information to the disk or may be used to read information resident on the disk. Because information is stored on the disk in tracks, typically spirally or concentrically arranged, the OPU 232 must be able to traverse the surface of the disk from the inside to the outside diameter in order to access the information formatted on the disk. To accomplish this, actuator arm 200 moves in two general directions relative to the surface of the optical disk. Generally, actuator arm 200 moves laterally across the disk surface for tracking purposes, which can be defined as the X-Y plane for convenience, and it also moves toward and away from the disk surface for focusing purposes, which can be defined as the Z direction for convenience. In this manner, as explained in greater detail below, actuator arm 200 can compensate for imperfections in the optical media and read and write data to and from the optical disk more accurately and faster than existing optical drives or magnetic drives.

Figure 3:
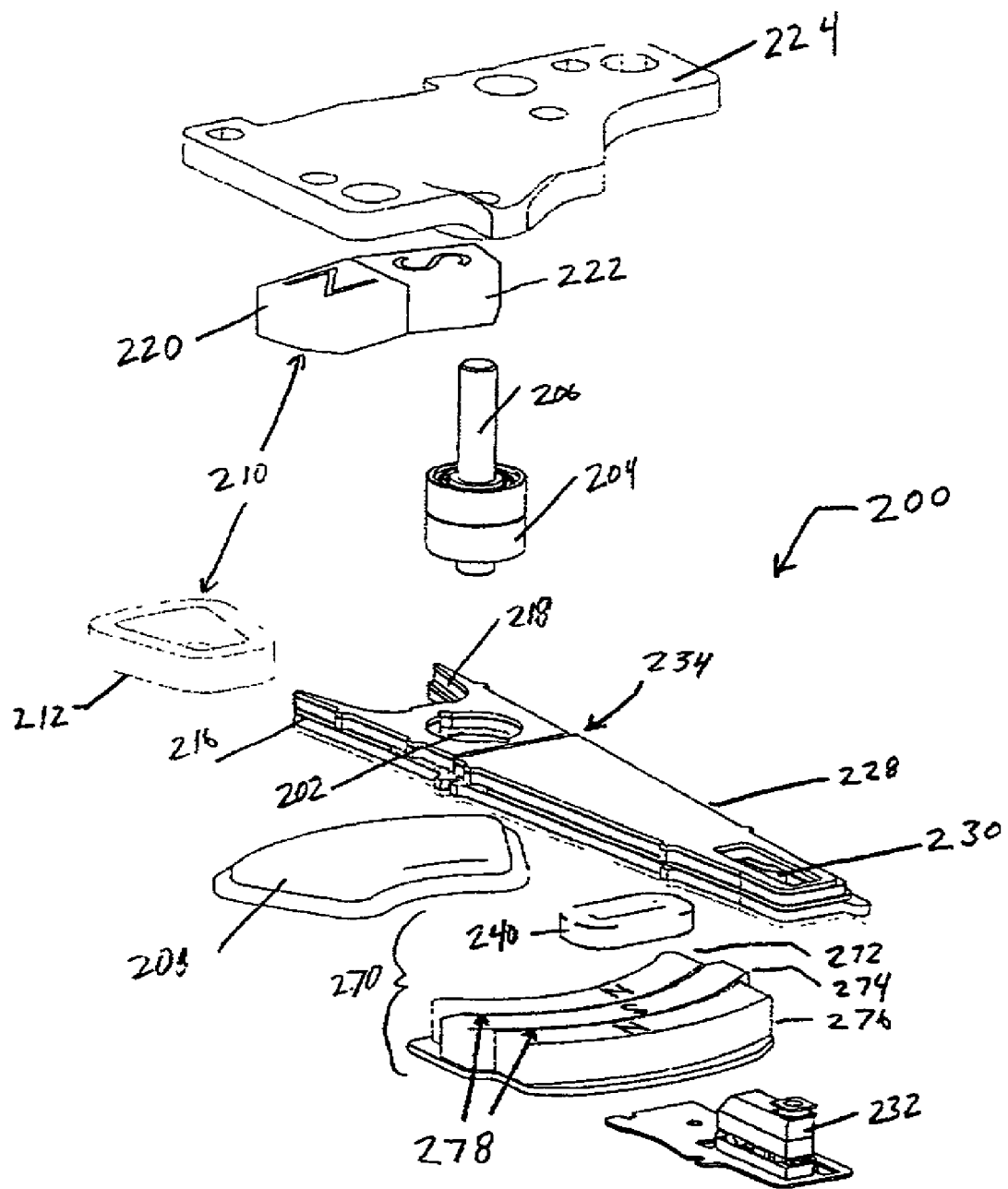
FIG. 3 is an exploded view of the component pieces of the tilt focus mechanism of the present invention.
Figure 4:
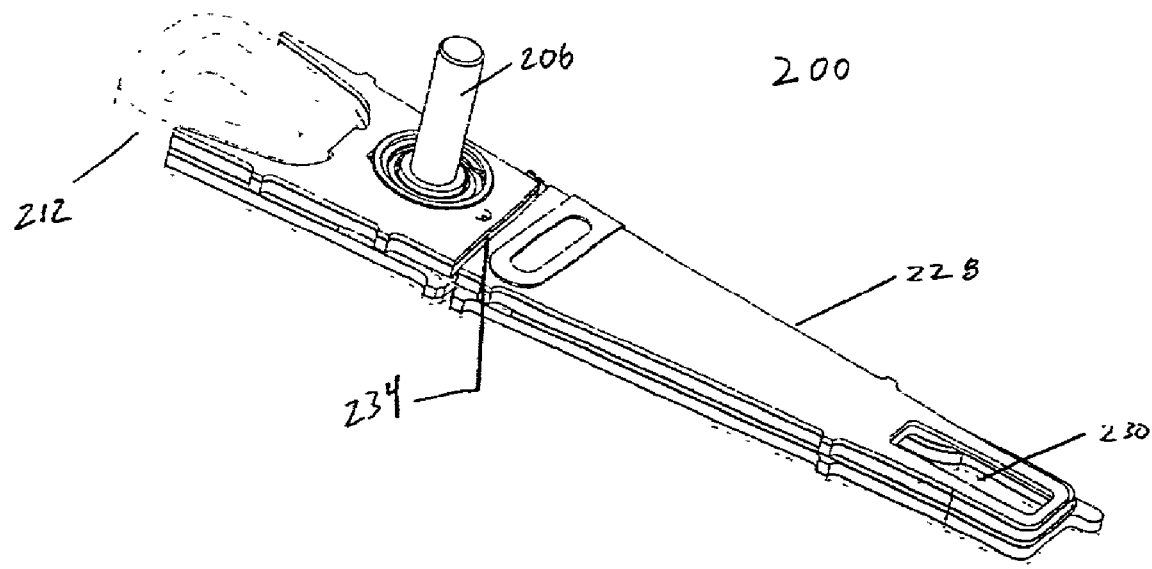
FIG. 4 is a three-quarter perspective view of the focus and tracking arm of the tilt focus mechanism shown in FIG. 3.

Referring first to FIGS. 2 and 3 specifically, this embodiment comprises the single actuator arm 200 which mounts to a bearing cartridge 204. The bearing cartridge 204 is rotatably connected to a shaft 206 mounted between baseplate 160 (not shown) and an aperture in a tracking voice coil motor ("VCM") magnet plate 224. For coarse and fine tracking purposes, the actuator arm 200 rotates in a conventional manner responsive to torque induced by VCM 210. The VCM 210 comprises a coil 212 placed within a pair of arms 216 and 218 at the rear end of the actuator arm 200. Permanent magnets 220 and 222, at magnet plate 224, in cooperation with variable current flowing in the coil 212 and the return path provided by tracking VCM return plate 208 and tracking VCM magnet plate 224, create the necessary torque to pivot the actuator arm 200 about the shaft 206. As will be appreciated, the components of the VCM 210 may be switched relative to each other such that the coil 212 is stationary and the magnets 220, 222 move with the shaft 206.

Figure 5:
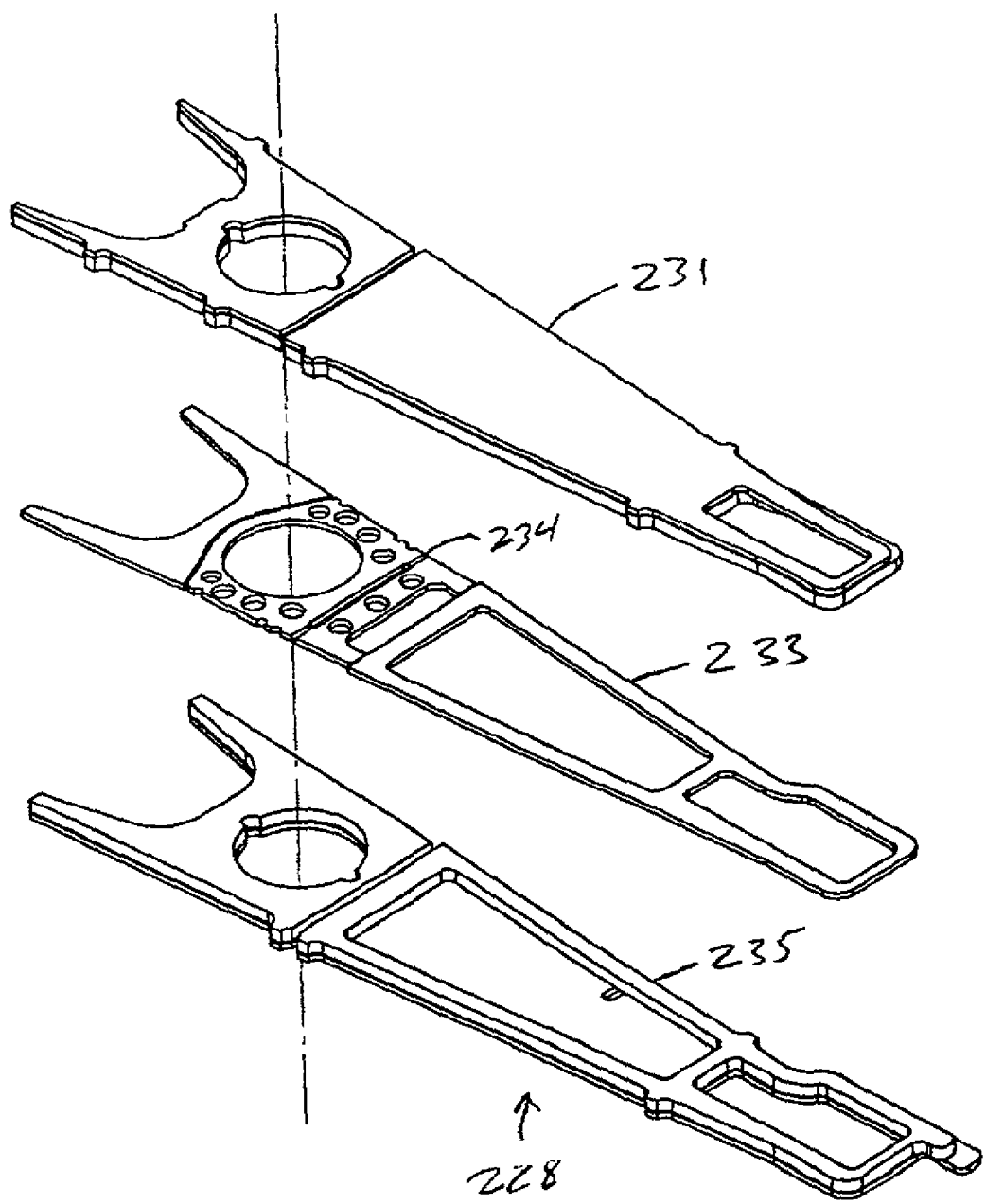
FIG. 5 is an exploded perspective view of the focus and tracking arm of the tilt focus mechanism shown in FIG. 3.

Cutout 230 at the distal end of actuator arm 200 is adapted to receive an OPU 232. Movement of a focus arm 228 of the actuator arm 200 in the Z direction (perpendicular to the disk surface) is accomplished by an integral flexure pivot 234 in the actuator 200 adjacent a bearing bore mount 202. Focus arm 228 is shown in FIG. 5 as a portion of a laminated composite structure. The laminate structure may comprise a two-piece carbon fiber composite upper layer 231, a three piece carbon fiber and metal center layer 233 which includes a metal flexure 234, and a two piece carbon fiber layer 235. Additional information on an advantageous structure of actuator arm 200 is given in Application No. 09/945,944, entitled "MECHANISM FOR LIMITING ACTUATOR ASSEMBLY MOVEMENT IN A DATA STORAGE/RETRIEVAL SYSTEM", filed on even date herewith.

As will be appreciated, the integral flexure pivot 234 is only one structure that can be used for movement of the focus arm 228 in a direction perpendicular to the surface of the optical disk. First, the structure need not be composite layers, but may be a single piece of material. Pivoting may be provided by any number of known mechanisms, including but not limited to a ball bearing pivot, a jewel bearing pivot, a knife edge pivot, or a torsional shear member pivot or any other type of pivot known by persons of skill in the art. Preferably the pivot will provide a spring force to counter the force from the coil.

Figure 6A:
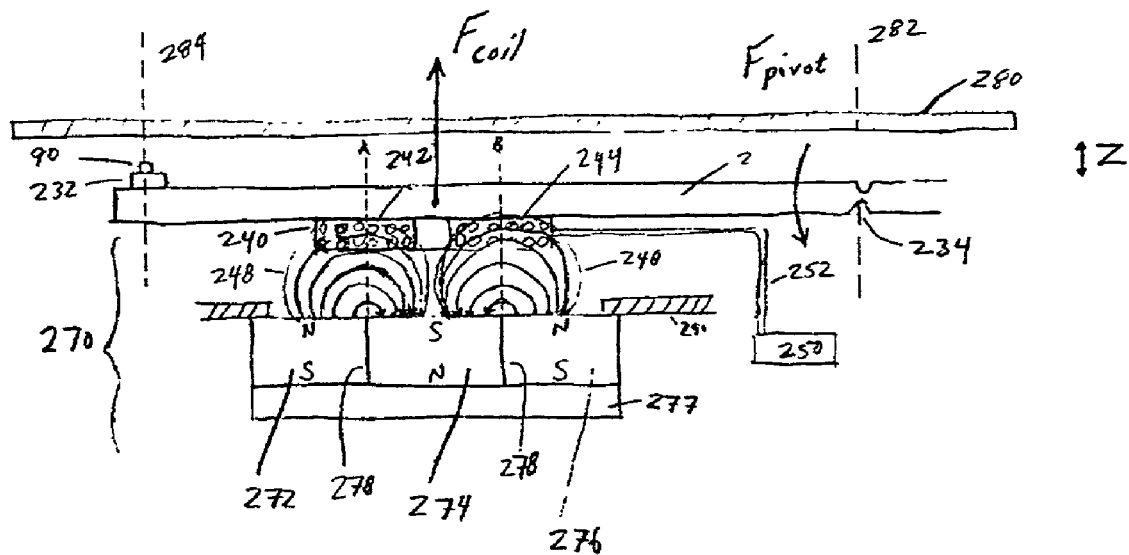
FIG. 6a is a cross-sectional view of the fringing field focus motor of the tilt focus mechanism shown in FIG. 3.

Turning to FIGS. 3 and 6a, fringing field focus motor ("FFFM") 270 adjusts the position of the OPU 232 in a direction substantially perpendicular to the surface of a disk 280. The orthogonal component of this movement repositions the OPU 232 and its objective lens 90 about a pivot axis 282, which coincides with flexure pivot 234, to accommodate for disk flatness, variations in thickness in the disk layers, vibrations imparted into the system by the various motors, bearing defects, spindle motor run out and any other imperfections that can lead to orthogonal misalignment of the OPU 232 relative to the data tracks. For example, if the disk is created in such a manner that the surface of the data layer fluctuates, the optical feed back to the processors of the focus servo system can sense a change in the quality of the light beam and adjust the position of the OPU 232 using FFFM 270 to correct for misalignment between the OPU 232 and the data layer. These adjustments are made dynamically to thereby decrease read/write errors and enhance performance.

Figure 6B:
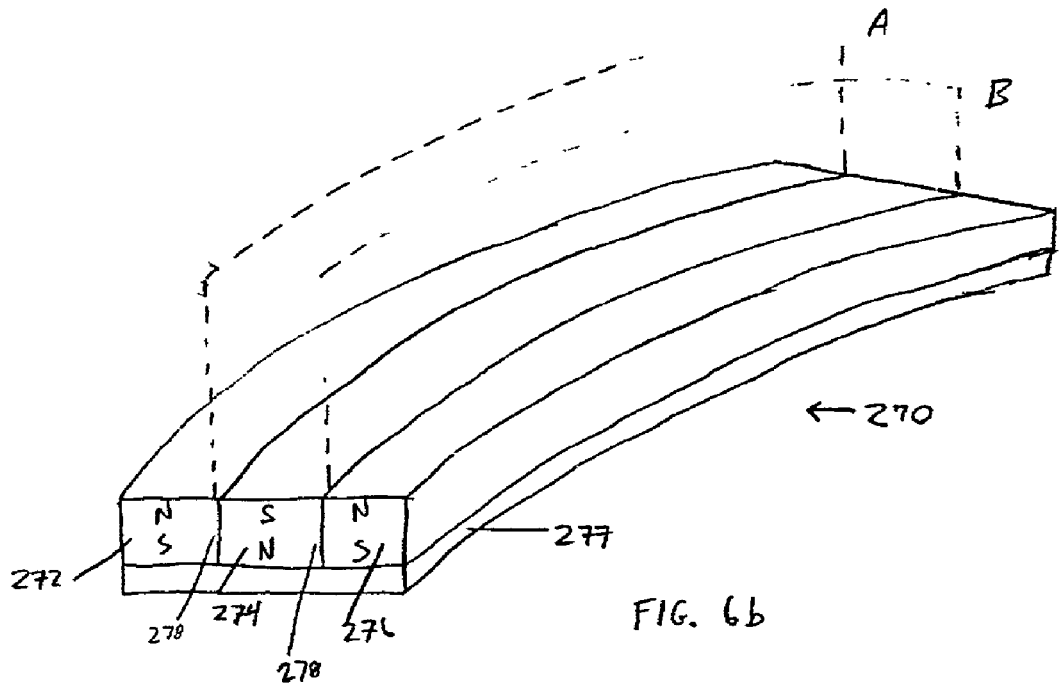
FIG. 6b is three-quarter perspective view of the permanent magnet structure of the tilt focus mechanism.

A first embodiment of the fringing field focus motor is shown in more detail in FIGS. 6a and 6b. Actuator arm 200 comprises pivot axis 282 and a lens axis 284 located on the distal end of actuator arm 200. Lens axis 284 goes through the center of lens 90. OPU 232 and lens 90 are located on the distal end of actuator arm 200, and applying a current to the focus coil 240 will create a force which moves the OPU 232 in a direction generally perpendicular to the surface of the disk 280, i.e. in the Z direction. Focus coil 240 is generally rectangular and is fixedly positioned to the bottom of actuator arm 200, and in this example has 126 turns. Each turn of the coil loops all the way around the coil and each single turn has four legs, corresponding to the four legs of the coil. Focus coil 240 could be any number of shapes such as but not limited to a rectangle, circle, square, parallelogram, hexagon, or oval.

FFFM structure 270 comprises three vertically magnetized zones, or individual magnets 272, 274, and 276 on a Ferro-magnetic pole piece 277, with the transitions 278 between the alternating magnetic fields centered below the active portions 242 and 244 of focus coil 240. The axes of transitions 278 are shown as A and B. Magnets 272, 274, and 276 are made of Neo Max 48BH Neodymium Iron Boron in this example but could be made of numerous magnetic materials known to those in art. As seen in FIG. 6b, FFFM structure 270 has an arcuate or curved shape such that the curve is aligned with the path of coil 240 as actuator arm 200 pivots about shaft 206. Transitions 278 between the three vertically magnetized zones or individual magnets 272, 274, and 276 are also arcuate and aligned with the path of coil 240. The portions 242 and 244 of focus coil 240 (shown in cross-section in FIG. 6a) are active because when a current is applied to the coil 240 by driver circuit 250, the force created at these portions is substantially perpendicular to disk surface 280, i.e. the Z component of the force is relatively large while other components are relatively negligible. This is because they are aligned with the transitions between the alternating magnetic zones, and hence the magnetic field lines produced by magnets 272, 274, and 276 are substantially horizontal when they pass through the active portions 242 and 244 of coil 240. Note that a geometric figure not having discrete sides, such as a circle or an oval may have two or more active portions or segments if two or more arcuate sections of the figure are aligned with, or track the transitions between similarly shaped magnets or magnetic zones. Preferably, the active portions 242 and 244 are arc-shaped to match the curvature of transitions 228, but the active portions 242 and 244 need not have exactly the same shape as the transitions 228 but need only be substantially aligned with the transitions 228 such that a significant component of the force generated is in the Z direction. Likewise, many slight modifications could be made which are within the scope of the invention such as adding one or more bends within the active portions of the focus coil thereby making the coil a hexagon, or octagon, etc.

Magnets 272, 274, and 276 and pole piece 277 of FFFM 270 are located beneath baseplate 290. Fringing field 248 is illustrated by a series of arcs of increasing radius. The field passes from magnets 272 and 276 over transitions 278 and into magnet 274. The point on any given arc farthest away from the surface of the magnets is directly above transitions 278. Magnets 272, 274, and 276 are a line source and thus it can generally be said that the field strength is inversely proportionate to the distance between focus coil 240 and magnets 272, 274, and 276. The coil is positioned at a point within the field of sufficient strength that the applied current causes focus arm 200 to rotate about flexure 234. In one embodiment, the distance between the center of coil 240 and magnets 272 and thus the radius of the arc passing through coil 240 is about 500 μm.

Figure 6C:
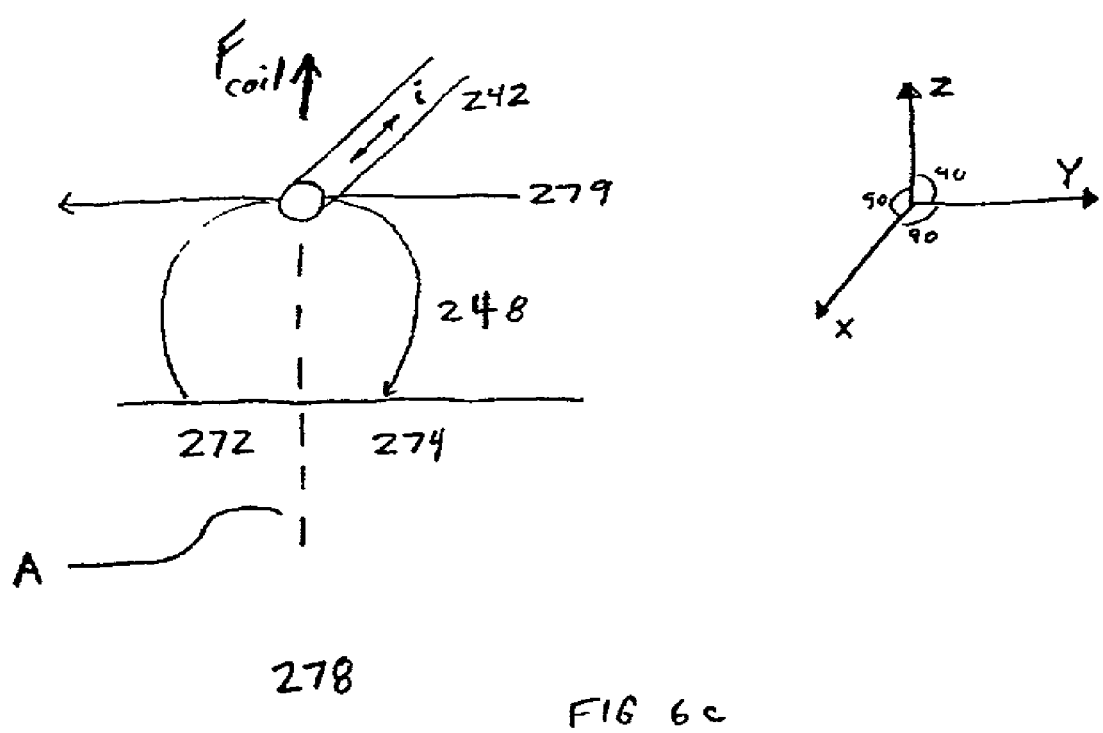
FIG. 6c is a three-quarter perspective of a wire of the focus coil of the fringing field focus motor.

As discussed above, the legs of focus coil 240 are also horizontally positioned (i.e. on the XY plane) such that two or more portions are aligned with transitions 278 on axis A and B. As seen in FIG. 6c, a tangent to any of the arcs of the magnetic field at a position directly over transitions 278, on axis A and B, is substantially parallel to the surface of the disk. These portions are active because the alignment of these portions with the fringing field is such that when a current is applied to the coil 240 by driver circuit 250, the force created at these portions is substantially perpendicular to disk surface 280. The magnetic fields over transitions 278 are essentially in opposite directions where they pass through active portions 242 and 244, and since the current is flowing through active portions 242 and 244 in opposite directions, the net force generated by the current in active portions 242 and 244 is in the same direction. The forces created at other portions of the coil not aligned with transitions 278 cancel each other out or have a relatively negligible Z component.

FIG. 6c shows current passing through one wire of active leg 242 on the X axis. Tangent 279 and fringing field 248 pass through the wire of coil 240 along the Y axis substantially orthogonally to the current in the active portions of coil 240, thus creating a large component force $F_{coil}$ in the Z direction, either towards or away from the surface of the disk.

$F_{coil}$ is a type of Lorentz force. The basic formula for the Lorentz force $\vec{F}$, acting on a particle of charge q, moving with a velocity $\vec{v}$ in a magnetic field $\vec{B}$ is given by $$\vec{F} = q\vec{v} \times \vec{B}.$$

The force is a vector (or cross) product of the velocity and magnetic field, and thus by definition the direction of the Lorentz force is perpendicular to the direction of both of these vectors. Currents consist of moving electrons. When a current-carrying wire is positioned in a magnetic field, these electrons will experience the above-described Lorentz force. The Lorentz forces acting on the individual electrons can be summed into a single force, acting on the wire of is length 1, and can be expressed as:

$$\vec{F}_{coil} = \vec{i} \times \vec{B} l.$$

Thus, as seen in FIG. 6c, the direction of the force $F_{coil}$ will be perpendicular to the directions of the current i and the magnetic field 248. In the embodiment of FIG. 6c this means that the direction of the $F_{coil}$ will be perpendicular to the disc, i.e in the Z direction. Because active portions 242 and 244 are located above transitions 278 at a position where a tangent to the fringing field is parallel to the surface of the disk, and thus located at the point where field 248 traverses active legs 242 and 244 substantially parallel to the disk, the Z component force is maximized. The fringing field 248 passes from the top of the north pole of each of the outer magnets 272 and 276 (not shown) through the active legs of focus coil 240 and into inner magnet 274. Referring again to FIG. 6a, the outer magnets 272 and 276 are aligned such that the north pole is facing the surface of the disk while the north pole of the central magnet 274 is facing away from the surface of the disk; however, a structure in which the polarities are reversed works equally well. Due to this arrangement, the distance between disk 280, actuator arm 200, and base 290 is substantially reduced and FFFM 270 results in greater packaging efficiency and miniaturization of the optical disk drive shown in FIG. 2.

Variable current is supplied to focus coil 240 by linear H bridge driver circuit 250 through wires 252. The current flow through coil 240 has variable amplitude and direction. In this particular example, the force produced by the coil is approximately 0.25 Newtons per Amp of current. Current flowing in one direction will produce a force which moves the lens closer to the disk, while current flowing in the opposite direction will move the lens away from the disk. An instantaneous current flowing through the coil would change the average distance between the lens and the disk by about two μm for each mA of current. An alternating current with one mA amplitude and a one Khz frequency produces an alternating acceleration of the lens towards and away from the disk of 0.25 m/s2. The force of gravity $F_g$ acting on the mass of the arm creates a force or moment about flexure pivot 234. An additional moment is created in actuator arm 200 by the restoring force $F_{pivot}$ of the metal in flexure pivot 234 when it is elastically deformed by movement of actuator arm 200. The component force $F_{coil}$ and its resulting moment together with $F_{pivot}$ and its resulting moment are of a magnitude that $F_g$ and its resulting moment become relatively insignificant. Therefore the orientation of the drive to the force of gravity is relatively insignificant.

Figure 7A:
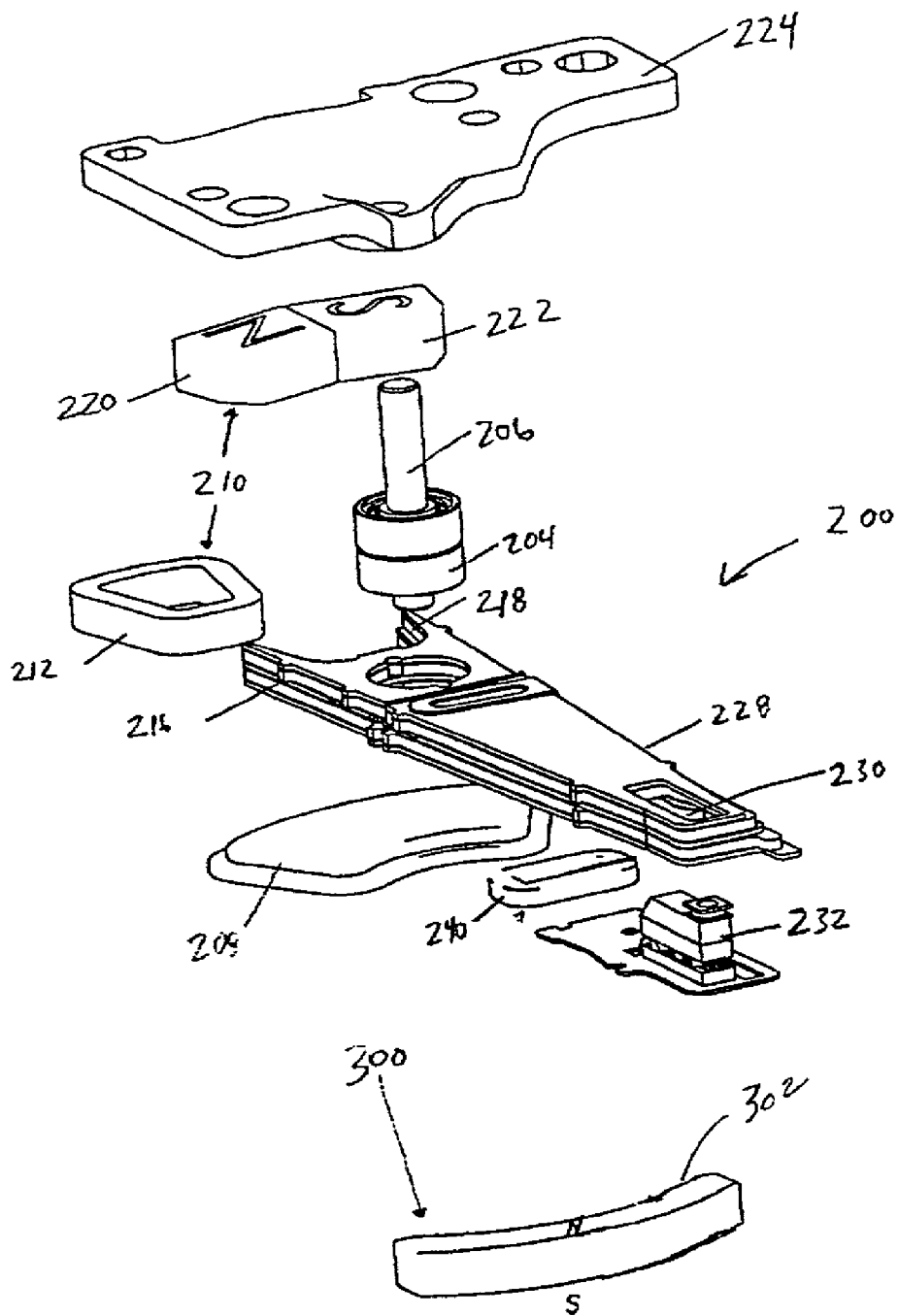
FIG. 7a is an exploded view of the component pieces of another embodiment of the fringing field focus motor of the present invention.
Figure 7B:
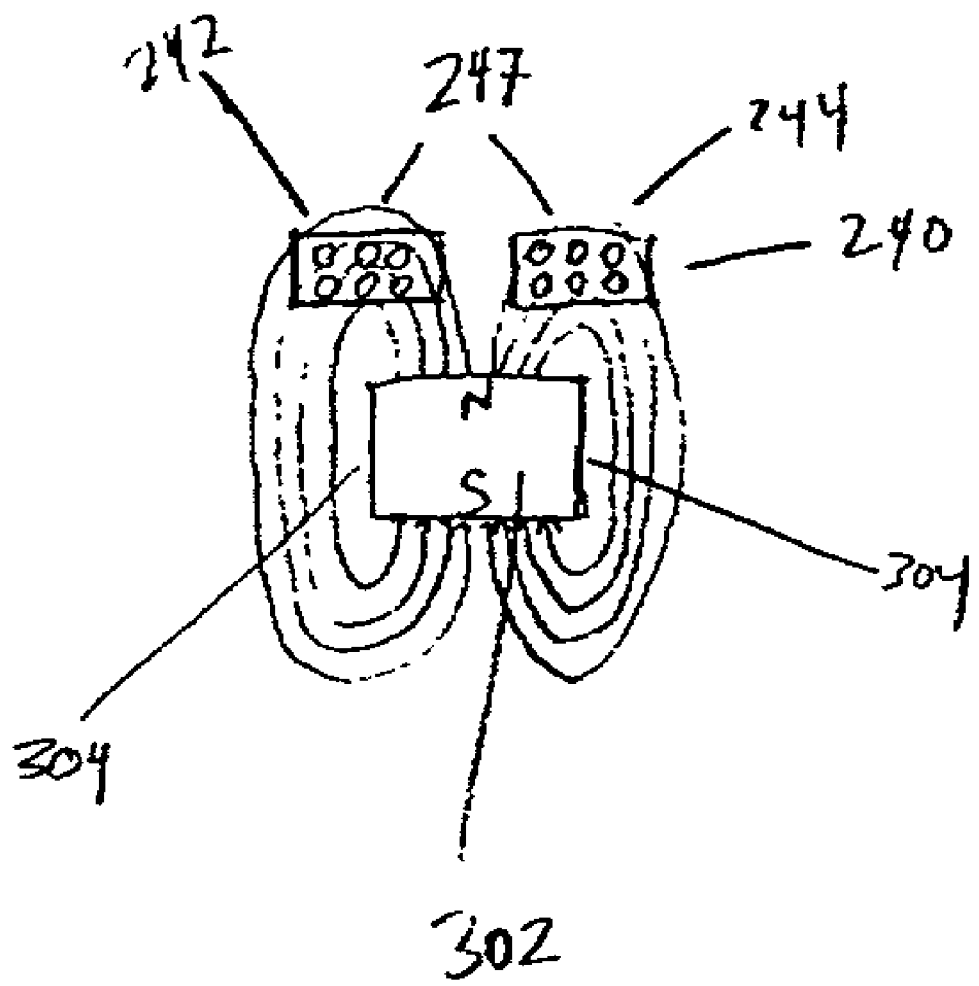

Another embodiment of the actuator assembly and fringing field focus motor is shown in FIGS. 7A and 7b. This embodiment is similar to the one shown in FIG. 3 except that a single magnet 302 has been substituted for the assembly of magnets 272, 274, and 276 in FFFM structure 300. The edges 304 of magnet 302, similar to transitions 278 of FIG. 3, are aligned with the center of active portions 242 and 244. While this system is more economical, it is also less efficient than the preferred system incorporating three magnets or vertically magnetized zones because less of magnetic field 248 passes through active portions 242 and 244 substantially parallel to the surface of disk 280 (not shown). In this embodiment, the magnetic field passes from the top pole of magnet 302 through the active portions of focus coil 240 and to the opposite pole of magnet 302. Applying a current to the focus coil 240 will create a force which moves the OPU 232 in a direction generally perpendicular to the disk surface 280, i.e. in the Z direction. In this example, focus coil 240 is rectangular and is fixedly positioned to the bottom of actuator arm 200. Focus coil 240 can be any number of shapes with two or more active portions located on the surface of actuator arm 200 and aligned with transitions 278, as was described in the prior embodiment.

Figure 8:
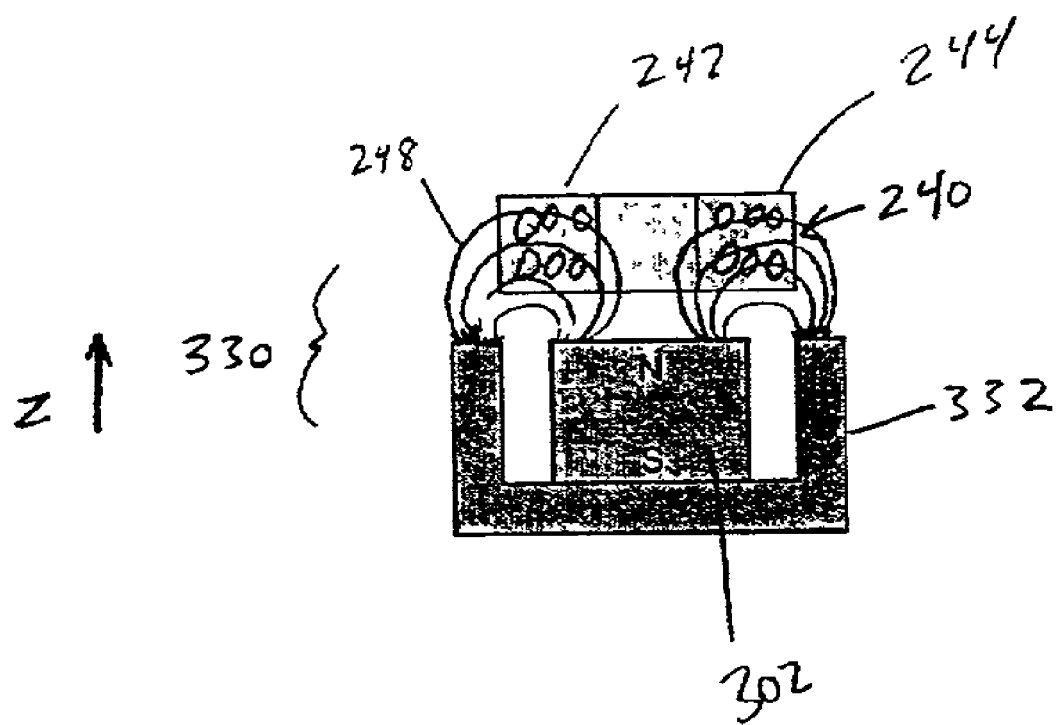
FIG. 8 is a cross-sectional view of another embodiment of the fringing field focus motor of the present invention.

As shown in another embodiment in FIG. 8, FFFM 330 comprises single magnet 302 with channel-shaped pole piece 332 having flanges extending towards focus coil 240. Pole piece 332 is located under single magnet 302. Magnet 302 and pole piece 332 have an arcuate or curved shape such that the curve is aligned with the path of coil 240. Pole piece 332 effectively extends the magnetic field of the south pole towards focus coil 240. Thus, the magnetic field 248 of FFFM 330 passes substantially horizontally through the active portions 242 and 244 of focus coil 240 such that a current running through focus coil 240 produces a vertical force, i.e. in the Z direction. The magnetic field 248 passes from the top of the north pole of the single magnet 302 through the active portions 242 and 244 of focus coil 240 and into pole piece 332.

While a few principal embodiments have been shown and described, it will be apparent that other modifications, alterations and variations may be made by and will occur to those skilled in the art to which this invention pertains, particularly upon consideration of the foregoing teachings.

For example, it should be understood that the location of any pivot point of the focus arm could be changed, as could the location and arrangement of the fringing field focus motor components. Either the magnets or the coil could be stationary and the other move relative to the stationary components. Also, the focus coil could be mounted to the underside of an arm having a flat surface, or recessed into the arm. The coil also need not be parallel to the surface of the permanent magnets. The respective VCM and FFFM magnets and coils, on both the tracking arm and focus arm, can be alternatively positioned on the same side of the rotational axis as the optical pick up unit or on the opposite side of the rotational axis as the optical pick up unit for the respective arm. In doing so, however, it should be understood that this relative close proximity of multiple coil motors may lead to cross coupling between the VCM and FFFM which can affect the performance of the tracking arm and focus arm.

It is therefore contemplated that the present invention is not limited to the embodiments shown and described and that any such modifications and other embodiments as incorporate those features which constitute the essential features of the invention are considered equivalents and within the true spirit and scope of the present invention.

What is claimed:

1. A system for controlling a distance between an optical head and the surface of a rotating optical disk comprising:
    an actuator arm including an optical head and having first and second surfaces, the actuator arm positioned between the optical disk and a magnet assembly, the first surface facing the optical disk, the second surface facing the magnet assembly;
    an electromagnetic coil having an inner void, said coil substantially parallel and adjacent to the second surface of the arm;
    the magnet assembly comprising three magnetized zones, a central zone and two outer zones, said zones having alternating magnetic fields wherein the transitions between the alternating zones are aligned with two or more active portions of the electromagnetic coil; and
    wherein the magnetic field from each of the outer zones passes through the electromagnetic coil and into the central zone.

2. The system of claim 1 wherein the magnetic field from each of the outer zones passes through the electromagnetic coil in a direction substantially parallel to the surface of the optical disk.

3. The system of claim 1 wherein there is no bobbin or pole piece in the void of the electromagnetic coil.

4. The system of claim 1 wherein the three magnetized zones are three individual magnets.

5. The system of claim 1 wherein the active portions are curved and the transitions are either linear or curved.

6. The system of claim 1 wherein the active portions are linear and the transitions are either linear or curved.

7. The system of claim 6 wherein the active portions include a bend.

8. The system of claim 1 wherein the coil has two opposed faces and edges, and one of the faces is affixed to the second surface of the arm.

9. A system for controlling a distance between an optical head and the surface of a rotating optical disk comprising:
    an actuator arm having a first and second surface, the first surface facing the optical disk, the first surface of the arm including the optical head, the second surface facing away from the optical disk;
    an electromagnetic coil having an inner void, said coil adjacent to the second surface of the arm; and
    at least one permanent magnet producing a magnetic field that passes through the coil such that when an electric current is applied to the coil a force is created at two or more segments of the coil, wherein the at least one magnet is at least three magnets, the poles of the magnets alternating such that there is a transition between each of the magnets and the alternating magnetic fields produced by the magnets.

10. The system of claim 9 wherein said two or more segments are aligned with a transition between alternating magnetic fields or the edge of a single magnet.

11. The system of claim 9 wherein there is no object in the void of the electromagnetic coil.

12. The system of claim 9 wherein the two or more segments are curved.

13. The system of claim 9 wherein the two or more segments are linear.

14. The system of claim 13 wherein one or more of the two or more segments includes a bend.

15. The system of claim 9 further comprising a pole piece adjacent to the at least three permanent magnets.

* * * * *